(12) United States Patent
Toyosawa

(10) Patent No.: US 8,962,152 B2
(45) Date of Patent: Feb. 24, 2015

(54) BRASS-PLATED STEEL CORD AND STEEL CORD-RUBBER COMPOSITE, AND TIRE USING THE SAME

(75) Inventor: Shinichi Toyosawa, Tokorozawa (JP)

(73) Assignee: Bridgestone Corporation, Tokyo (JP)

( * ) Notice: Subject to any disclaimer, the term of this patent is extended or adjusted under 35 U.S.C. 154(b) by 87 days.

(21) Appl. No.: 13/394,962

(22) PCT Filed: Sep. 8, 2010

(86) PCT No.: PCT/JP2010/005508
§ 371 (c)(1),
(2), (4) Date: Mar. 8, 2012

(87) PCT Pub. No.: WO2011/030547
PCT Pub. Date: Mar. 17, 2011

(65) Prior Publication Data
US 2012/0177944 A1    Jul. 12, 2012

(30) Foreign Application Priority Data

Sep. 9, 2009 (JP) ................................. 2009-208562

(51) Int. Cl.
| | | |
|---|---|---|
| B32B 15/06 | (2006.01) |
| B32B 15/02 | (2006.01) |
| B60C 1/00 | (2006.01) |
| C08K 7/02 | (2006.01) |
| B60C 9/00 | (2006.01) |
| D07B 1/06 | (2006.01) |
| C23C 22/05 | (2006.01) |
| C25D 5/48 | (2006.01) |
| C25D 7/06 | (2006.01) |
| C08K 3/08 | (2006.01) |

(52) U.S. Cl.
CPC .............. *C08K 7/02* (2013.01); *B60C 9/0007* (2013.01); *D07B 1/0666* (2013.01); *C23C 22/05* (2013.04); *C25D 5/48* (2013.01); *C25D 7/0607* (2013.01); *C08K 2003/0856* (2013.01); *D07B 2205/3089* (2013.01); *D07B 2401/2095* (2013.01); *D07B 2501/2046* (2013.01); *B60C 2009/0021* (2013.04); *D07B 2201/2043* (2013.01)
USPC ............ 428/625; 428/607; 428/677; 152/565

(58) Field of Classification Search
None
See application file for complete search history.

(56) References Cited

U.S. PATENT DOCUMENTS

| | | | | |
|---|---|---|---|---|
| 4,265,678 A | | 5/1981 | Hachisuka et al. | |
| 4,549,594 A | * | 10/1985 | Ancel et al. ................... | 152/564 |
| 4,906,680 A | * | 3/1990 | Umeda et al. ................. | 524/183 |
| 5,994,434 A | * | 11/1999 | Uchino et al. ................ | 524/174 |
| 6,372,697 B1 | * | 4/2002 | Lorentz et al. ................ | 508/198 |
| 2002/0088522 A1 | * | 7/2002 | Uchino et al. ................ | 152/537 |
| 2012/0101207 A1 | * | 4/2012 | Satou ............................ | 524/424 |
| 2013/0302606 A1 | * | 11/2013 | Tahara ........................ | 428/377 |

FOREIGN PATENT DOCUMENTS

| | | |
|---|---|---|
| JP | 55-71887 A | 5/1980 |
| JP | 2001-234371 A | 8/2001 |
| JP | 2004-66298 A | 3/2004 |
| JP | 2004-83766 A | 3/2004 |
| JP | 2009-91691 A | 4/2009 |
| JP | 2009-215674 A | 9/2009 |

OTHER PUBLICATIONS

Machine translation of JP 2004-083766. Mar. 2004.*
Machine translation of JP 2009-091691. Apr. 2009.*
Machine translation of JP 2009-215674. Sep. 2009.*
Chinese Office Action, dated Nov. 26, 2013, issued by the State Intellectual Property Office of the People's Republic of China, in counterpart Application No. 201080050557.6.
Japanese Office Action issued in corresponding JP Application No. 2011-530753, dated Jun. 24, 2014.
Chinese Office Action issued in corresponding CN Application No. 201080050557.6, dated Aug. 1, 2014.

* cited by examiner

*Primary Examiner* — John J Zimmerman
(74) *Attorney, Agent, or Firm* — Sughrue Mion, PLLC

(57) ABSTRACT

The present invention relates to a brass-plated steel cord capable of further improving initial adhesiveness and heat-resistant adhesiveness between a coating rubber and a steel cord and also imparting excellent durability to a resulting rubber article, and more particularly to a brass-plated steel cord, wherein an outermost surface thereof contains 0.3 to 1.7 atomic % of phosphorus, 4.93 to 14 atomic % of zinc, and 0.01 to 2.0 atomic % of a metal having an ionization tendency lower than that of zinc and higher than that of copper as measured by XPS (X-ray photoelectron spectroscopy), and an amount of zinc in the outermost surface is 30 to 90 atomic % based on 100 atomic % of a total amount of zinc and copper.

5 Claims, No Drawings

BRASS-PLATED STEEL CORD AND STEEL CORD-RUBBER COMPOSITE, AND TIRE USING THE SAME

CROSS REFERENCE TO RELATED APPLICATIONS

This application is a National Stage of International Application No. PCT/JP2010/005508 filed Sept. 8, 2010, claiming priority based on Japanese Patent Application No. 2009-208562 filed Sept. 9, 2009, the contents of all of which are incorporated herein by reference in their entirety.

TECHNICAL FIELD

The present invention relates to a brass-plated steel cord being excellent in initial adhesiveness and heat-resistant adhesiveness with a coating rubber, a steel cord-rubber composite, and a tire using the same as a reinforcing member.

BACKGROUND ART

For the purpose of reinforcing a rubber to improve strength and durability thereof, a steel cord-rubber composite in which metal reinforcing materials such as steel cords are coated with a coating rubber are used for rubber articles required to have strength, such as tires for automobiles, conveyor belts, and hoses. Here, in order that such a steel cord-rubber composite can have a high reinforcing effect and reliability, stable and strong adhesion is required between the coating rubber and the metal reinforcing materials.

To provide such a steel cord-rubber composite having high adhesiveness between a coating rubber and metal reinforcing materials, so-called direct vulcanization adhesion is widely used. In the direct vulcanization adhesion, metal reinforcing materials such as steel cords that are plated with zinc, brass, and the like are embedded in a coating rubber comprising sulfur, and they are adhered to each other at the same time as the vulcanization of the rubber by heat vulcanization. Various studies on such direct vulcanization adhesion have been made to further improve adhesiveness between a coating rubber and metal reinforcing materials by the direct vulcanization adhesion.

For example, Patent Document 1 discloses a method of producing reinforcing steel cords for a steel cord-rubber composite formed by twisting a plurality of filaments manufactured by wet drawing of brass-plated steel wires. In this method, as an agent for improving adhesiveness between the steel cords and the coating rubber, resorcin is added to a wet drawing lubricant used in the drawing of the steel wires, so that resorcin is applied to the filament surfaces. Also, Patent Document 2 discloses a technique of cleaning surfaces of steel wires and steel cords to be used with an acidic or alkaline solution to remove a phosphorus compound (derived from a lubricant used for manufacturing the steel cords) which serves as an adhesion inhibitor, and thereby improving adhesion to the coating rubber.

PRIOR ART DOCUMENTS

Patent Documents

Patent Document 1: JP-A-2004-66298
Patent Document 2: JP-A-2001-234371

SUMMARY OF THE INVENTION

Problems to be Solved by the Invention

Nevertheless, both of the techniques still have room for improvement. For example in the method disclosed in Patent Document 1, if resorcin is altered by heat generated in the drawing of the steel filaments, resorcin would not effectively serve as an agent for improving adhesion between the steel cords and the coating rubber. Therefore, another solution is needed. Meanwhile, Patent Document 2 does not specify the amount of the reduced phosphorus compound on the steel cord surfaces after cleaning, the ratio of copper and zinc, and a composition of others; thus, more detailed study on such aspects is desired.

On the other hand, a rubber composition comprising a cobalt salt as an adhesion promoter is employed for a coating rubber to improve initial adhesiveness between the coating rubber and the metal reinforcing materials in direct vulcanization adhesion generally used for tires and the like. However, the amount of cobalt salt is preferably reduced as much as possible in terms of improving resistance to degradation, crack growth and the like of the coating rubber.

It is, therefore, an object of the present invention to provide a brass-plated steel cord and a steel cord-rubber composite capable of further improving initial adhesiveness and heat-resistant adhesiveness between a coating rubber and a steel cord and also imparting excellent durability to a resulting rubber article, as well as a tire using them as a reinforcing member.

Means for Solving the Problem

In order to solve the above problems, the inventor of the present invention has found a steel cord in which certain metals exist in the outermost surface at a specific ratio and thus completed the present invention.

That is, a brass-plated steel cord of the present invention is characterized in that an outermost surface thereof contains 0.3 to 1.7 atomic % of phosphorus, 4.93 to 14 atomic % of zinc, and 0.01 to 2.0 atomic % of a metal having an ionization tendency lower than that of zinc and higher than that of copper as measured by XPS (X-ray photoelectron spectroscopy), and an amount of zinc in the outermost surface is 30 to 90 atomic % based on 100 atomic % of a total amount of zinc and copper.

Further, a steel cord-rubber composite of the present invention is formed by coating the above brass-plated steel cord with a rubber composition comprising sulfur. The rubber composition preferably comprises 1 to 10 parts by mass of the sulfur based on 100 parts by mass of a rubber component.

The rubber composition preferably comprises 0.005 to 0.08 part by mass in terms of boron of a boron-containing compound based on 100 parts by mass of a rubber component, and preferably contains no cobalt.

A tire of the present invention is characterized by using the above steel cord-rubber composite as a reinforcing member.

EFFECT OF THE INVENTION

The brass-plated steel cord according to the present invention makes it possible to obtain the steel cord-rubber composite that exhibits excellent initial adhesiveness and heat-resistant adhesiveness with the coating rubber and has improved durability.

Therefore, the use of such a steel cord-rubber composite as a reinforcing member allows a high performance tire to be realized.

BEST MODE FOR CARRYING OUT THE INVENTION

The present invention will be described in detail below.

The brass-plated steel cord of the present invention is characterized in that an outermost surface thereof contains 0.3 to 1.7 atomic % of phosphorus, 4.93 to 14 atomic % of zinc, and 0.01 to 2.0 atomic % of a metal having an ionization tendency lower than that of zinc and higher than that of copper as measured by XPS (X-ray photoelectron spectroscopy), and an amount of zinc in the outermost surface is 30 to 90 atomic % based on 100 atomic % of a total amount of zinc and copper.

The outermost surface of the brass-plated steel cord herein means a region having a thickness in the depth direction from the steel cord surface, which is measured by XPS (X-ray photoelectron spectroscopy). More specifically, the thickness is a thickness of approximately several nanometers corresponding to the depth through which photoelectrons generated by irradiation of the brass-plated steel cord surface with an X-ray are released.

As such an outermost surface of the brass-plated steel cord of the present invention is measured by the above-mentioned XPS, the steel cord contains 0.3 to 1.7 atomic %, preferably 0.4 to 1.6 atomic %, more preferably 0.5 to 1.5 atomic % of phosphorus in its outermost surface. When the content of phosphorus is less than 0.3 atomic %, high activity of the steel cord would lead to mishandling in storage or the like, or would limit the conditions for forming a composite with a rubber, or the like, while when the phosphorus content is more than 1.7 atomic %, the rate of initial adhesion between the brass-plated steel cord and the coating rubber would be reduced.

Further, the above outermost surface contains 4.93 to 14 atomic %, preferably 4.95 to 13.5 atomic %, and more preferably 5.0 to 13 atomic % of zinc. When the content of zinc is less than 4.93 atomic %, adhesion durability of the resulting steel cord-rubber composite would become insufficient, while when the zinc content is more than 14 atomic %, the rate of initial adhesion between the steel cord and the coating rubber would be reduced.

Furthermore, the above outermost surface contains 0.01 to 2.0 atomic %, preferably 0.02 to 1.5 atomic %, more preferably 0.05 to 1.0 atomic % of a metal having an ionization tendency lower than that of zinc and higher than that of copper. When the content of such a metal is less than 0.01 atomic %, adhesiveness with the coating rubber would be reduced, and this also applies to the case where the metal content exceeds 2.0 atomic %.

Here, examples of the metal having an ionization tendency lower than that of zinc and higher than that of copper include chromium (Cr), iron (Fe), cadmium (Cd), cobalt (Co), nickel (Ni), tin (Sn), and lead (Pb). Among them, cobalt is preferable. Cobalt is generally compounded as an adhesion promoter in a coating rubber to further improve the adhesiveness; however, cobalt would be the factor in reducing durability to heat, humidity, and oxidation of the coating rubber itself depending on the amount of cobalt contained in the coating rubber. Meanwhile, the presence of such cobalt in the brass-plated steel cord makes it possible to reduce the cobalt content in the coating rubber and to reduce cost while effectively suppressing deterioration in the rubber properties.

The above outermost surface contains 30 to 90 atomic %, preferably 35 to 80 atomic % of zinc on the basis that a total amount of zinc and copper is 100 atomic %. The brass-plated steel cord containing zinc in the amount within the above range can sufficiently achieve the effects desired in the present invention.

The above brass-plated steel cord can be produced, for example, by the following method. The peripheral surface of a steel wire is plated with brass, and then the steel wire is subjected to a drawing process. A composition of such a plating has typically 70% by mass or less, preferably 60% to 65% by mass of copper, and 30% by mass or more, preferably 35% to 40% by mass of zinc. The surface of the obtained steel wire is dipped into an aqueous solution containing a metal having an ionization tendency lower than that of zinc and higher than that of copper as a metal salt. Then, a plurality of such steel wires may be twisted together. Further, after the plurality of these steel wires are twisted to from a steel cord, the surface of the steel cord may be dipped into the above aqueous solution containing the metal salt.

Such a metal salt is not limited in particular, as long as it is highly soluble in water. Examples of the metal salt include metal chlorides, metal carbonates, metal nitrates, metal sulfates, metal acetates, metal citrates, metal gluconates, and metal acetylacetonates. Among them, the metal acetates are preferable for realizing a favorable pH value described below in the aqueous solution containing the metal salt.

The aqueous solution containing the metal salt typically has a concentration of 0.001 mol/L to 1 mol/L, preferably 0.005 mol/L to 0.5 mol/L, more preferably 0.01 mol/L to 0.2 mol/L. The pH value thereof is typically 6.1 to 8.0, preferably 6.3 to 7.5, more preferably 6.5 to 7.2. An aqueous solution containing a metal salt achieving a concentration and a pH value within the above ranges would not adversely affect the brass plating and can allow the predetermined amounts of phosphorus, zinc, and a metal having an ionization tendency lower than that of zinc and higher than that of copper to be present in the outermost surface of the steel cord. Further, such a pH value is also preferable in terms of considering the environment and the safety in manufacturing.

Note that the time for immersing the steel cord in the aqueous solution containing the metal salt may be determined as appropriate, typically to 0.05 seconds to 30 seconds, preferably 0.1 seconds to 20 seconds.

Through such an immersion process, the surface of the steel wire or steel cord is cleaned; accordingly, a component known to inhibit the adhesion to a coating rubber made of a rubber composition for coating a steel cord in accordance with the present invention (ZnO, a phosphorus compound, or the like) can be moderately removed. Thus, the initial adhesiveness between the steel cord and the coating rubber can be further improved.

The steel cord-rubber composite of the present invention can be obtained by coating the above brass-plated steel cord with a rubber composition comprising sulfur and vulcanizing it by a conventional method. Sulfur acts as a vulcanizing agent of a rubber, and the loading amount can be appropriately selected as necessary. Typically, the amount of sulfur compounded may be 1 to 10 parts by mass, preferably 2 to 9 parts by mass, more preferably 3 to 8 parts by mass based on 100 parts by mass of a rubber component. The amount of sulfur compounded within the above range allows favorable vulcanization adhesiveness and rubber properties to be achieved.

The rubber composition used as a coating rubber preferably comprises a boron-containing compound in addition, in terms of improving durability of adhesion between the steel cord and the coating rubber and in terms of achieving sufficient antirust effects. Specifically, the rubber composition preferably comprises 0.005 to 0.08 part by mass, preferably 0.01 to 0.06 part by mass, more preferably 0.02 to 0.055 part by mass in terms of boron of a boron-containing compound based on 100 parts by mass of a rubber component. When the amount of the boron-containing compound is less than 0.005 part by mass in terms of boron, the durability of adhesion between the steel cord and the coating rubber would not be improved; while when the amount of the boron-containing compound is more than 0.08 part by mass in terms of boron, an initial vulcanization rate of the rubber would be reduced and this would be a factor in reducing the rate of initial adhesion between the steel cord and the coating rubber.

Here, the boron-containing compound is not limited in particular, as long as it contains boron. Specifically, examples of the boron-containing compound may include boric acid, ammonium borate, zinc borate, and tetrafluoroboric acid. Among them, boric acid is preferable in terms of availability, low cost, and the like. These may be used alone or in a combination of two or more.

Further, the rubber component of the above rubber composition is not limited in particular, as long as it can be employed for rubber articles such as tires for automobiles, conveyor belts, and hoses. Examples of the rubber component may include natural rubber, polybutadiene rubber, polyisoprene rubber, ethylene-propylene copolymer, isobutylene-isoprene copolymer, and polychloroprene rubber. These may be used alone or in a combination of two or more.

In addition to the above rubber component, sulfur, and the boron compound, the above rubber composition may comprise additives employed in the rubber industry such that the object of the present invention would not be undermined. Specifically, examples of the additives may include a resin, a filler such as carbon black, an oil component such as a process oil, a vulcanizing agent other than sulfur, a vulcanization accelerator, an antioxidant, a softener, zinc oxide, and stearic acid. After adding the rubber component, sulfur, and the boron compound, and the additives if necessary, the above rubber composition can be obtained through kneading, warming, and extruding by a conventional method.

Note that when the outermost surface of the above brass-plated steel cord contains cobalt as a metal having an ionization tendency lower than that of zinc and higher than that of copper, the amount of cobalt can be reduced when it is compounded into the above rubber composition. For example, the cobalt content may be reduced to less than 0.04 part by mass based on 100 parts by mass of the rubber component, or cobalt may not necessarily be compounded. In this case, degradation of the properties of the coating rubber can be effectively suppressed and the cost can be reduced as well. In this point of view, no cobalt is preferably contained.

The tire of the present invention is characterized by using the steel cord-rubber composite of the present invention as a reinforcing member such as a carcass ply, a belt ply, or the like. The structure of the tire itself is not limited in particular, and a known tire structure can be employed as is.

EXAMPLES

The present invention will be demonstrated below based on examples; however, the present invention is not limited to these examples.

Example 1

Steel wires plated with brass (Cu: 63% by mass, Zn: 37% by mass) are twisted together to produce a steel cord having a 1×3 structure. Subsequently, this steel cord is immersed in 0.1 mol/L of an aqueous solution of cobalt acetate (controlled to pH 6.8 with acetic acid) for 10 seconds, and redundant liquid on the cord is removed by air blowing. After that, the steel cord is dried at 50° C. for one minute. Such steel cords are arranged in parallel and coated with a rubber composition having a formulation shown in Table 1 from both sides thereof, and vulcanized under the conditions shown in Table 1 to prepare a sample. Initial adhesiveness, aging properties, and crack growth of the sample are evaluated by the following method. The obtained evaluation results, and the results of measuring the content (atomic %) of phosphorus (P), zinc (Zn) and cobalt (Co), and the ratio of zinc to the total of zinc and copper (Zn/Zn+Cu) in the composition of the outermost surface of the steel wire after the above immersion by X-ray photoelectron spectroscopy (XPS, Quantum 2000 manufactured by ULVAC-PHI, Inc.) are shown in Table 1.

Example 2

A sample is prepared and evaluated in a similar manner to Example 1 except for using a rubber composition comprising a cobalt salt of fatty acid as shown in Table 1. The obtained results are shown in Table 1.

Comparative Example 1

A sample is prepared and evaluated in a similar manner to Example 1 except for using a rubber composition having a formulation shown in Table 1 without performing the above immersion treatment using an aqueous solution of cobalt acetate. The obtained results are shown in Table 1.

Comparative Example 2

A sample is prepared and evaluated in a similar manner to Example 1 except for that 0.1 mol/L of an aqueous solution of cobalt acetate (controlled to pH 6.0 with acetic acid) is used in the above immersion treatment and a rubber composition having a formulation shown in Table 1 is used. The obtained results are shown in Table 1.

Comparative Example 3

A sample is prepared and evaluated in a similar manner to Example 1 except for that 0.1 mol/L of an aqueous solution of cobalt acetate (controlled to pH 7.5 with acetic acid) is used in the above immersion treatment and a rubber composition having a formulation shown in Table 1 is used. The obtained results are shown in Table 1.

Comparative Example 4

A sample is prepared and evaluated in a similar manner to Example 1 except for that 0.1 mol/L of an aqueous solution of zinc acetate (controlled to pH 7.0 with acetic acid) is used in the above immersion treatment and a rubber composition having a formulation shown in Table 1 is used. The obtained results are shown in Table 1.

Example 3

A sample is prepared and evaluated in a similar manner to Example 1 except for using a rubber composition not comprising boric acid as shown in Table 1. The obtained results are shown in Table 1.

Example 4

A sample is prepared and evaluated in a similar manner to Example 1 except for using a rubber composition having a different boric acid content as shown in Table 1. The obtained results are shown in Table 1.

<Initial Adhesiveness Evaluation Method>

The samples are vulcanized at 160° C. for 4 minutes, at 160° C. for 6 minutes, at 160° C. for 8 minutes, or at 160° C. for 10 minutes; and left at 100° C. for 15 days. Then, a steel cord is pulled out from each sample and the rubber coating state is determined by visual observation in accordance with ASTM-D-2229. The rubber coverage is represented by 0% to 100% and is used as an index of the initial adhesiveness.

(elongation at break (%)) and Tb (tensile strength at break (MPa)). Thus, TF (toughness: Eb×Tb) after thermal aging and TF (toughness: Eb×Tb) after hygrothermal aging are determined and expressed by an index on the basis that the toughness in Comparative Example 1 is 100.

<Method of Evaluating Crack Growth of Rubber>

The samples are subjected to a constant stress fatigue test using a fatigue tester manufactured by Ueshima Seisakusho Co., Ltd to measure the number of cycles to fracture, which is expressed by an index on the basis that the number of cycles to fracture in Comparative Example 1 is 100. A larger numeric value indicates more excellent crack growth resistance.

TABLE 1

| | | | Example 1 | Example 2 | Comparative Example 1 | Comparative Example 2 | Comparative Example 3 | Comparative Example 4 | Example 3 | Example 4 |
|---|---|---|---|---|---|---|---|---|---|---|
| Steel cords | Immersion treatment | | Cobalt acetate aqueous solution (pH 6.8) | Cobalt acetate aqueous solution (pH 6.8) | — | Cobalt acetate aqueous solution (pH 6.0) | Cobalt acetate aqueous solution (pH 7.5) | Zinc acetate aqueous solution (pH 7.0) | Cobalt acetate aqueous solution (pH 6.8) | Cobalt acetate aqueous solution (pH 6.8) |
| | (atomic %) measured in Outermost surface | P | 0.9 | 0.9 | 2.0 | 0.25 | 1.8 | 1.7 | 0.9 | 0.9 |
| | | Zn | 7.0 | 7.0 | 10.4 | 4.5 | 10.0 | 14.5 | 7.0 | 7.0 |
| | | Zn/Zn + Cu | 38.0 | 38.0 | 72.0 | 28.0 | 68.0 | 91.0 | 38.0 | 38.0 |
| | | Co | 0.4 | 0.4 | 0.0 | 0.005 | 0.3 | 0.0 | 0.4 | 0.4 |
| Rubber composition (parts by mass) | Natural rubber | | 100 | 100 | 100 | 100 | 100 | 100 | 100 | 100 |
| | HAF carbon black | | 60 | 60 | 60 | 60 | 60 | 60 | 60 | 60 |
| | Zinc white | | 8 | 8 | 8 | 8 | 8 | 8 | 8 | 8 |
| | Antioxidant *1 | | 2 | 2 | 2 | 2 | 2 | 2 | 2 | 2 |
| | Vulcanization accelerator *2 | | 1 | 1 | 1 | 1 | 1 | 1 | 1 | 1 |
| | Sulfur | | 5 | 5 | 5 | 5 | 5 | 5 | 5 | 5 |
| | Cobalt salt of fatty acid *3 | | 0 | 1.0 | 0 | 0 | 0 | 0 | 0 | 0 |
| | Boric acid (in terms of boron) *4 | | 0.3 (0.0525) | 0.3 (0.0525) | 0.3 (0.0525) | 0.3 (0.0525) | 0.3 (0.0525) | 0.3 (0.0525) | 0 | 0.5 (0.0875) |
| | | | | | Evaluation | | | | | |
| Initial adhesiveness (%) | 160° C. × 4 min vulcanization | | 80 | 90 | 0 | 100 | 10 | 20 | 90 | 50 |
| | 160° C. × 6 min vulcanization | | 100 | 100 | 20 | 100 | 40 | 40 | 100 | 80 |
| | 160° C. × 8 min vulcanization | | 100 | 100 | 70 | 100 | 80 | 90 | 100 | 90 |
| | 160° C. × 10 min vulcanization | | 100 | 100 | 100 | 100 | 100 | 100 | 100 | 100 |
| Heat-resistant adhesiveness (%) | 70° C. × 95 RH % for 7 days after 160° C. × 20 min vulcanization | | 100 | 90 | 90 | 60 | 100 | 100 | 60 | 100 |
| Aging properties of Rubber | TF after thermal aging (index) | | 100 | 90 | 100 | 100 | 100 | 100 | 100 | 90 |
| | TF after hygrothermal aging (index) | | 100 | 80 | 100 | 100 | 100 | 100 | 100 | 90 |
| Crack growth of Rubber (index) | | | 100 | 60 | 100 | 100 | 100 | 100 | 100 | 100 |

*1 NOCRAC 6C, N-phenyl-N'-(1,3-dimethylbutyl)-p-phenylenediamine, produced by OUCHI SHINKO CHEMICAL INDUSTRIAL CO., LTD
*2 NOCCELER DZ, N,N'-dicyclohexyl-2-benzothiazolylsulfenamide, produced by OUCHI SHINKO CHEMICAL INDUSTRIAL CO., LTD
*3 MANOBOND C 22.5, cobalt content: 22.5% by mass, produced by OM Group, Inc.
*4 Produced by TOKYO CHEMICAL INDUSTRY CO., LTD.

<Heat-Resistant Adhesiveness Evaluation Method>

The samples are vulcanized at 160° C. for 20 minutes, and left at 70° C. and a relative humidity of 95% for seven days. Then, a steel cord is pulled out from each sample and the rubber coating state is determined by visual observation in accordance with ASTM-D-2229. The rubber coverage is represented by 0% to 100% and is used as an index of the heat-resistant adhesiveness.

<Method of Evaluating Aging Properties of Rubber>

Unvulcanized rubbers are vulcanized at 160° C. for 20 minutes, and then aged at 100° C. for two days (thermal aging condition) or at 70° C. and a humidity of 100% for four days (hygrothermal aging condition). After that, a tensile test is performed in accordance with JIS K6251 to measure Eb The results in Table 1 clearly show that Example 1 employing a steel cord containing the specific amounts of P, Zn, and Zn/Zn+Cu in the outermost surface as measured by XPS has excellent initial adhesiveness without depending on the vulcanization conditions while maintaining similar or better heat-resistant adhesiveness as compared with Comparative Examples 1 to 4, and can effectively suppress the degradation in the rubber properties.

Further, Table 1 shows that Example 1 employing a rubber composition comprising 0.005 to 0.08 part by mass in terms of boron of a boron-containing compound can achieve not only excellent initial adhesiveness but also better heat-resistant adhesiveness and can retain better rubber properties, as compared with Example 3 using a rubber composition comprising no boron-containing compound and Example 4 using a rubber composition comprising more than 0.08 part by mass in terms of boron of a boron-containing compound.

The invention claimed is:

1. A steel cord-rubber composite formed by coating a brass-plated steel cord with a rubber composition comprising sulfur,
   wherein an outermost surface of the brass-plated steel cord contains 0.3 to 1.7 atomic % of phosphorus, 7.0 to 14 atomic % of zinc, and 0.01 to 2.0 atomic % of a metal having an ionization tendency lower than that of zinc and higher than that of copper as measured by XPS (X-ray photoelectron spectroscopy), and
   an amount of zinc in the outermost surface is 30 to 90 atomic % based on 100 atomic % of a total amount of zinc and copper.

2. The steel cord-rubber composite according to claim 1, wherein the rubber composition comprises 1 to 10 parts by mass of the sulfur based on 100 parts by mass of a rubber component.

3. The steel cord-rubber composite according to claim 1, wherein the rubber composition comprises 0.005 to 0.08 part by mass in terms of boron of a boron-containing compound based on 100 parts by mass of a rubber component.

4. The steel cord-rubber composite according to claim 1, wherein the rubber composition does not contain cobalt.

5. A tire using the steel cord-rubber composite as claimed in claim 1 as a reinforcing member.

\* \* \* \* \*